No. 784,533. Patented March 14, 1905.

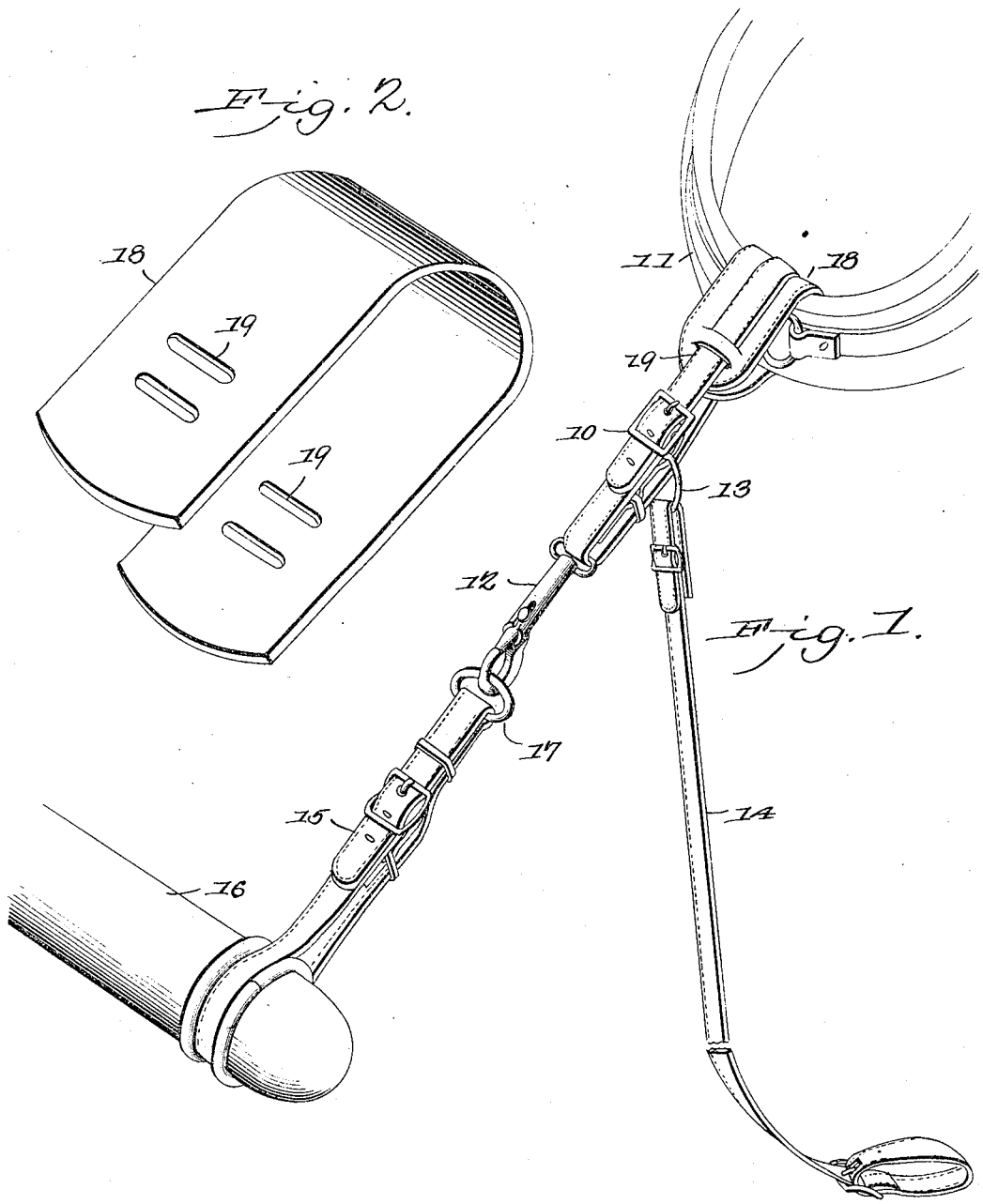

UNITED STATES PATENT OFFICE.

JOHN T. BASS, OF DAINGERFIELD, TEXAS.

HARNESS ATTACHMENT.

SPECIFICATION forming part of Letters Patent No. 784,533, dated March 14, 1905.

Application filed July 15, 1904. Serial No. 216,708.

*To all whom it may concern:*

Be it known that I, JOHN T. BASS, a citizen of the United States, residing at Daingerfield, in the county of Morris and State of Texas, have invented a new and useful Harness Attachment, of which the following is a specification.

This invention relates to attachments to harness for connecting the collars, neck-yokes, and martingale portions of the same, and has for its object to provide a simply-constructed device which may be quickly connected to and disconnected from the harness or vehicle and as quickly coupled and uncoupled when hitching up and unhitching, whereby much time is saved and annoyance obviated.

Another object of the invention is to provide a simply-constructed attachment whereby the collars and neck-yokes are connected and without producing wear or undue friction or chafing upon the collar or the connecting-straps.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fall within the scope of the invention and the claim made therefor.

In the drawings thus employed, Figure 1 is a perspective view of the improved device applied. Fig. 2 is a detached perspective view, enlarged, of the wear-plate.

In team-harnesses as ordinarily constructed with the connecting-straps between the collar and neck-yoke wrapped several times around the collar at the throat end and with the martingale-straps also leading around the collar at the throat a considerable degree of friction and chafing occurs both upon the straps and collar caused by the constant motion of the horse and often resulting in serious wearing and injury to the collar. This manner of coupling these parts also requires much time and causes serious delay both in hitching up and unhitching and causes much annoyance to the driver. To obviate these difficulties and to produce a connecting means between the collar and neck-yoke and between the collar and girth-straps or with the martingale-straps, which may be fully connected by simply connecting a single device, such as a harness-snap, is the end accomplished by means of the present invention, which consists of a strap connection 10 for enclasping the throat portion 11 of the collar and terminating in a coupling means, such as an ordinary harness-snap 12.

The collar-engaging strap member is constructed with suitable buckles and loops to enable it to be readily attached to and detached from the collar and adjusted relative thereto to adapt it to different-sized horses or different-sized vehicles and will also be provided with a depending ring 13, from which the martingale or girth-connecting strap 14 swings, as shown. A strap member 15 is detachably connected to the neck-yoke, (indicated at 16,) as by suitable buckles and loops, and terminates in a ring 17 for engagement with the snap-hook 12.

Where the strap member 10 embraces the collar 11, it is provided with a shield 18, of soft leather or similar material, to receive the friction and receive all the chafing and wear, and thus not only protect the collar, but likewise the strap member 10. The shield 18 is provided with spaced clefts, as at 19, forming loops through which the strap member 10 is woven when applied to firmly retain the parts in their proper relative positions. The strap member 10, together with its swinging martingale member 14, remains attached to the collar, while the strap member 15 remains upon the neck-yoke, so that in hitching up or unhitching it is only necessary to connect and disconnect one single snap-hook at each of the collars to complete the action.

The device may be adapted to all sizes and makes of harness and may be ornamented and finished to correspond to the other parts of the harness.

Having thus described the invention, what is claimed is—

An attachment for harness comprising a strap carrying at one end a detachable shield to embrace the collar and having combined with its other end a snap-hook, a ring depending from the strap intermediate of its ends, and a martingale combined with the ring.

In testimony that I claim the foregoing as my own I have hereto affixed my signature in the presence of two witnesses.

JOHN T. BASS.

Witnesses:
L. A. CAMPBELL,
RAY V. CROUDER.